US007688865B2

(12) United States Patent
Carlson et al.

(10) Patent No.: US 7,688,865 B2
(45) Date of Patent: *Mar. 30, 2010

(54) METHOD AND SYSTEM FOR CLOCK SKEW AND OFFSET ESTIMATION

(75) Inventors: Scott M. Carlson, Tucson, AZ (US); Michel Henri Theodore Hack, Cortland Manor, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1203 days.

This patent is subject to a terminal disclaimer.

(21) Appl. No.: 11/223,876

(22) Filed: Sep. 9, 2005

(65) Prior Publication Data

US 2007/0086489 A1   Apr. 19, 2007

(51) Int. Cl.
*H04J 3/06* (2006.01)
*G06F 1/12* (2006.01)
*G06F 1/04* (2006.01)
(52) U.S. Cl. .................. 370/516; 370/518; 370/519; 713/400; 713/503
(58) Field of Classification Search ......... 370/516–519; 713/400, 500, 503
See application file for complete search history.

(56) References Cited

U.S. PATENT DOCUMENTS

| | | | | |
|---|---|---|---|---|
| 6,661,810 | B1 * | 12/2003 | Skelly et al. | 370/516 |
| 6,957,357 | B2 * | 10/2005 | Liu et al. | 713/503 |
| 7,103,514 | B1 * | 9/2006 | Carlson et al. | 702/189 |
| 7,194,649 | B2 * | 3/2007 | Liu et al. | 713/400 |
| 7,475,272 | B2 | 1/2009 | Carlson et al. | |
| 2002/0120416 | A1 | 8/2002 | Liu et al. | |
| 2002/0176525 | A1 | 11/2002 | Yamaguchi et al. | |
| 2002/0188881 | A1 | 12/2002 | Liu et al. | |
| 2003/0031284 | A1 | 2/2003 | Ishida et al. | |
| 2003/0035444 | A1 | 2/2003 | Zwack | |
| 2005/0234927 | A1 | 10/2005 | Bande et al. | |
| 2007/0061607 | A1 * | 3/2007 | Carlson et al. | 713/503 |
| 2007/0086490 | A1 * | 4/2007 | Carlson et al. | 370/516 |

OTHER PUBLICATIONS

Moon et al., "Estimation and Removal of Clock Skew from Network Delay Measurements", Department of Computer Science, University of Massachusetts, 1999, pp. 1-8.*

(Continued)

*Primary Examiner*—Tri H Phan
(74) *Attorney, Agent, or Firm*—Scully, Scott, Murphy & Presser, P.C.; John E. Campbell

(57) ABSTRACT

Disclosed are a method and system for estimating the skew and offset between two clocks in a computer system. The method comprises the steps of obtaining a first set of data values representing a forward delay between the first and second clocks, and obtaining a second set of data values representing a negative backward delay between the first and second clocks. The method comprises the further steps of forming a lower convex hull for said first set of data values, and forming an upper convex hull, above the lower convex hull, for said second set of data values. The clock offset and the skew between said first and second clocks are estimated using those convex hulls. In a preferred embodiment, this estimation is made by identifying a best clock line between the first and second convex hulls.

18 Claims, 4 Drawing Sheets

OTHER PUBLICATIONS

Paxson, "On Calibrating Measurements of Packet Transit Times", Network Research Group, University of California, Berkeley, 1988, pp. 1-13.*

Mills, D., "Internet Time Synchronization: The Network Time Protocol", IEEE Transactions on Communications, Oct. 1991, pp. 1485-1486.

Mills, D., "Internet Time Synchronization: The Network Time Protocol", IEEE Transactions on Communications, Oct. 1991, pp. 14825-14826.

U.S. Appl. No. 11/223,878, pending.

* cited by examiner

US 7,688,865 B2

METHOD AND SYSTEM FOR CLOCK SKEW AND OFFSET ESTIMATION

CROSS REFERENCE TO RELATED APPLICATIONS

This application is related to application Ser. No. 11/223,878 for "Method And System For Clock Skew And Offset Estimation," filed Sep. 9, 2005; application Ser. No. 11/223,577 for "Use of T4 Timestamps To Calculate Clock Offset And Skew," filed Sep. 9, 2005; and application Ser. No. 11/223,730 for "Filter Turning Point Detection," filed Sep. 9, 2005, now U.S. Pat. No. 7,103,514, issued Sep. 5, 2006. The disclosures of the above-identified applications are herein incorporated by reference in their entireties.

BACKGROUND OF THE INVENTION

1. Field of the Invention

This invention generally relates to computer systems, and in particular to time synchronization in computer systems. Even more specifically, the invention relates to methods and systems for the estimation of clock offset and skew between two clocks in a computer system.

2. Background Art

Modern computers use clocks for many purposes, including ensuring that many operations occur in the proper sequence or in synchronization. Because of this, it is important that the clocks themselves operate in close synchronization. Typically, two clocks are often not in perfect synchronization, and there are timing differences between the clocks. In addition, two clocks may not operate at the exact same frequency, so that the timing difference between the clocks changes over time. This change in the timing difference between the clocks is referred to as the clock skew.

Many computer-timing protocols require information such as the estimation of the skew and offset between two clocks. These two clocks may be, for example, a local clock and its source clock. The accuracy of these estimations is crucial for the synchronization of the protocol. For instance, a protocol may require that a calculated time of day (TOD) offset between two servers include an estimation of the accuracy of the calculation. This is referred to as the clock-offset dispersion and bounds the worst-case error for the calculation. While methods and systems to measure clock skew are known, these known procedures tend to be quite complex, unreliable in certain situations, or both.

SUMMARY OF THE INVENTION

An object of this invention is to provide an improved procedure for estimating the clock skew and offset between two clocks in a computer system.

Another object of the present invention is to use both forward delay and backward delay to estimate the skew and offset between two clocks in a computer system.

These and other objectives are attained with a method and system for estimating the skew and offset between first and second clocks in a computer system. Also, the invention may be embodied in a program storage device readable by machine, tangibly embodying a program of instructions executable by the machine to perform method steps for estimating clock skew and offset between first and second clocks in a computer system. The method comprises the steps of obtaining a first set of data values representing a forward delay between the first and second clocks, and obtaining a second set of data values representing a negative backward delay between the first and second clocks. The method comprises the further steps of forming a lower convex hull for said first set of data values, and forming an upper convex hull, below the lower convex hull, for said second set of data values. The clock offset and the skew between said first and second clocks are estimated using those convex hulls.

In a preferred embodiment, this estimation is made by forming a clock line between said first and second convex hulls, identifying a best position for this clock line between the first and second convex hulls, and using that best position to estimate the clock offset and the skew between said first and second clocks.

Further benefits and advantages of the invention will become apparent from a consideration of the following detailed description, given with reference to the accompanying drawings, which specify and, show preferred embodiments of the invention.

DETAILED DESCRIPTION OF THE PREFERRED EMBODIMENTS

Figure 1:
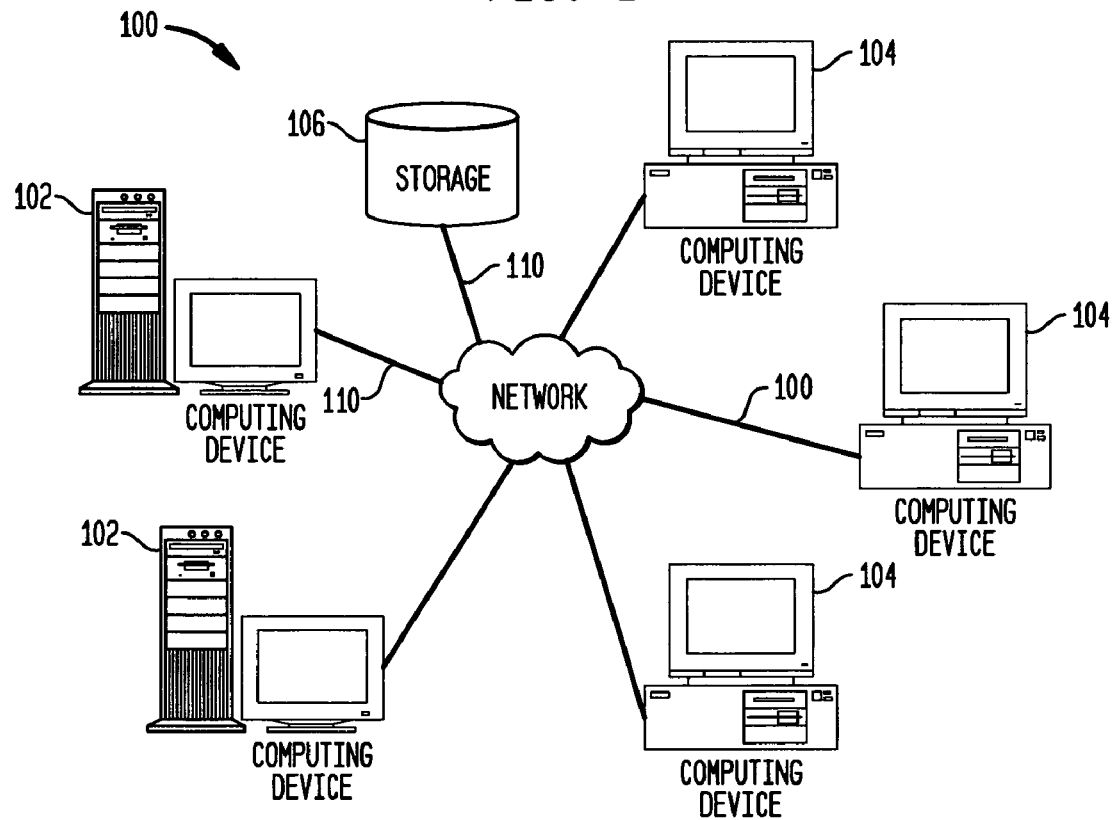
FIG. 1 illustrates a network of data processing systems in which the present invention may be implemented.

FIG. 1 illustrates a computer network 100, including servers 102, clients 104 and data storage unit 106. Network 100 also includes data connections 110 for transmitting data between the devices of the network. Network 100 may be, for example, the Internet, but could also be an intranet, a local area network, a wide area network, point-to-point links, or other networks.

Any suitable servers 102 may be used in the network 100. Also, the clients 104 of network 100 may be, for example, personal computers, laptop computers, servers, workstations, main frame computers, or other devices capable of communicating over the network. Similarly, connectors 110 may comprise a wide range of suitable devices, such as wire, fiber optics or wireless communication links.

As mentioned above, various computer timing protocols, including the Server Timing Protocol (STP), require information about the skew and offset between two clocks in computer systems or networks, such as network 100. The present invention is directed to determining the clock skew and offset estimation.

Figure 2:
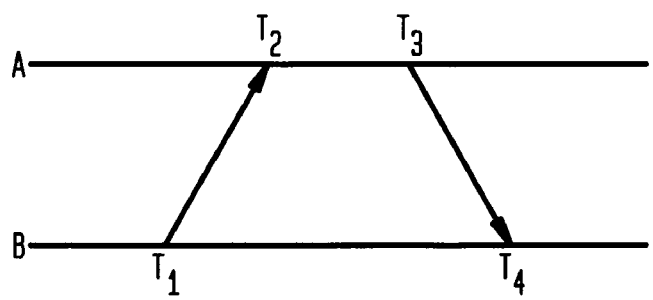
FIG. 2 illustrates a packet exchange between a clock machine B and a clock server A in the network of FIG. 1.

Reference is first made to FIG. 2, which illustrates a packet exchange between a local machine B and a clock server A. The packet leaves B at time T1, according to B's clock. The packet arrives at A at time T2, according to A's clock. Machine A then sends a reply packet at time T3, according to A's clock. The reply message reaches B at time T4, according to B's clock. By sending out this kind of exchange message regularly and recording the sequence of T1, T2, T3, T4 timestamps, one can obtain estimates of the relative offset and speed difference between the clock of machine B and the clock of machine A.

Procedures are known that compute a sequence of forward and backward delays (FD and BD) from the sequence of T1, T2, T3, T4 timestamps. For example, such procedures are described in U.S. patent application Ser. Nos. 09/920,138 and 10/157,610 and in U.S. Pat. No. 6,661,810. In particular, $$FD=T2-T1, BD=T4-T3.$$

Let's use T1(i), T2(i), T3(i), T4(i), FD(i) and BD(i) to denote the timestamps and delays for the $i^{th}$ packet exchange. Prior arts constructs two sets of delay points in the two dimensional plane, $\{(T1(i), FD(i))|i=1, \ldots\}$ and $\{(T1(i), BD(i))|i=1, \ldots\}$. U.S. Pat. No. 6,661,810 considers the two sets of points independently, which may not yield accurate results as the present invention. U.S. patent application Ser. Nos. 09/920,138 and 10/157,610 consider the two sets of delay points jointly, which yield better accuracy than U.S. Pat. No. 6,661,810.

Figure 3:
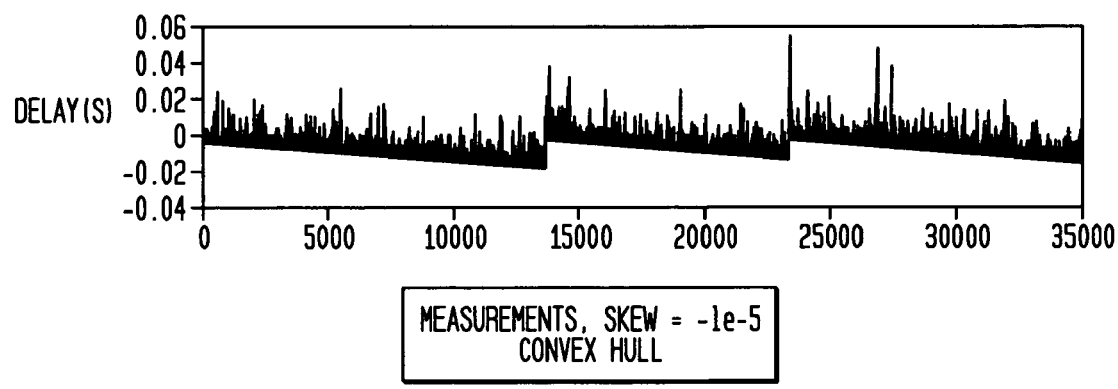
FIG. 3 shows a graph of delay measurements where a clock adjusts it offset at certain points in time.

In particular, U.S. patent application Ser. No. 10/157,610 solves the problem of finding two parallel skew lines for delay data comprising two separate line segments. It is applied to the case where a clock adjusts its offset at certain points in time. The clock runs at the same speed before and after the adjustment. Therefore, the skew lines for the data before and after the adjustment are parallel. FIG. 3 shows an example of this scenario.

Figure 4:
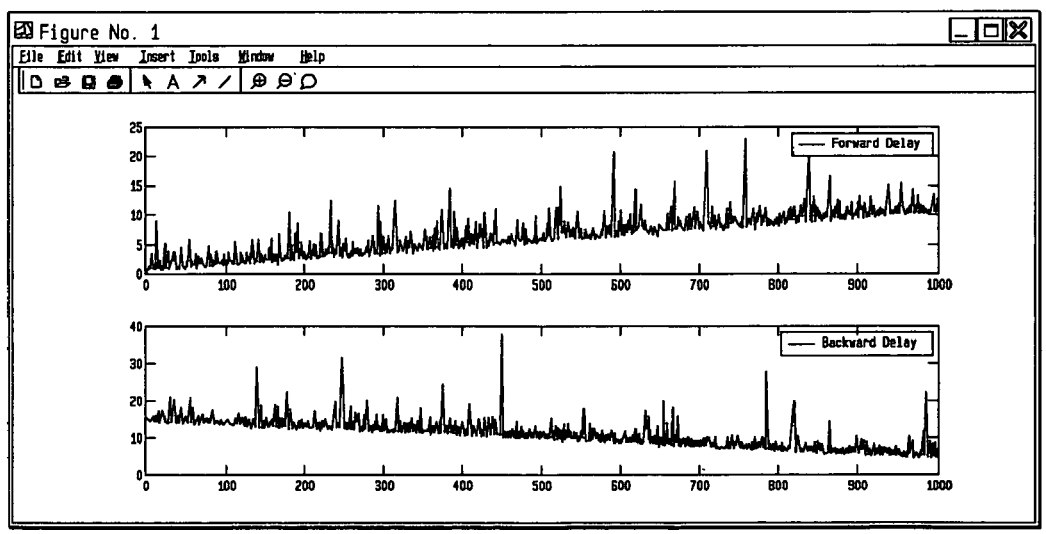
FIG. 4 is a graph that takes into account both forward and backward time delays.

With reference to FIG. 4, if both the forward and the backward delays are taken into consideration, it can be seen that the underlying skew lines are symmetric, or mirror images.

Figure 5:
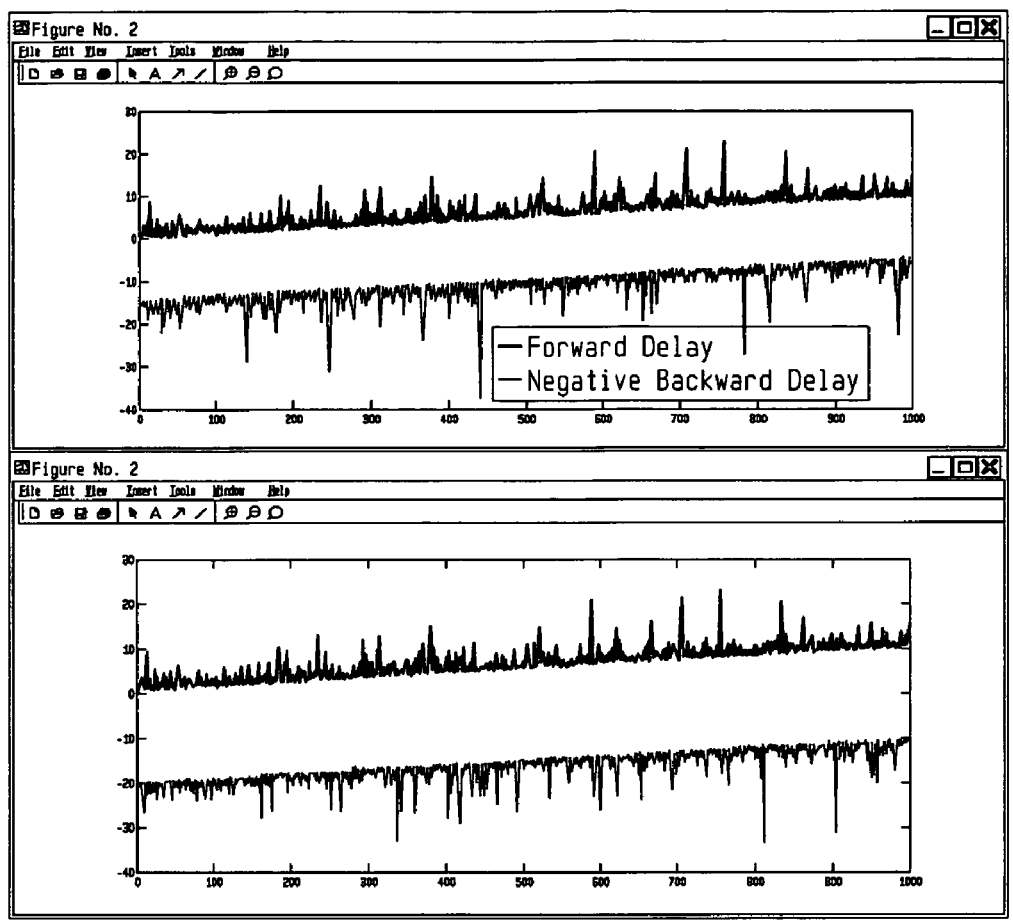
FIG. 5 shows both the forward and the negative of the backward delay lines on the same graph.

FIG. 5 shows both the forward and the negative of the backward delay lines plotted in the same Figure. It can be observed that the skew lines become parallel. The distance between the two parallel skew lines is the estimate of the round trip delay between the two machines. A question is how to find the estimate of parallel skew lines.

Figure 6:
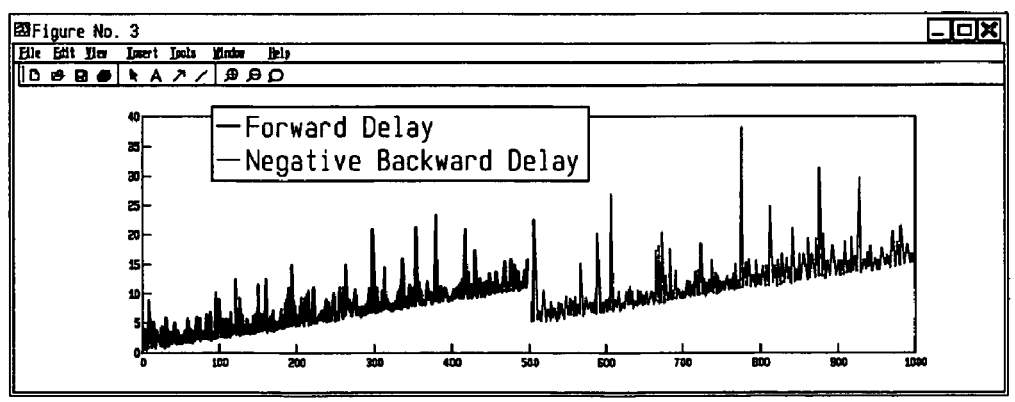
FIG. 6 shows a plot of the backward delay lines in reverse order.

One way of finding the best pair of parallel skew lines is to plot the backward delay lines in reverse order, as shown in FIG. 6. Any suitable method can be used to find the best skew lines. One suitable method is disclosed, for example, in U.S. patent application Ser. No. 10/157,610.

Figure 7:
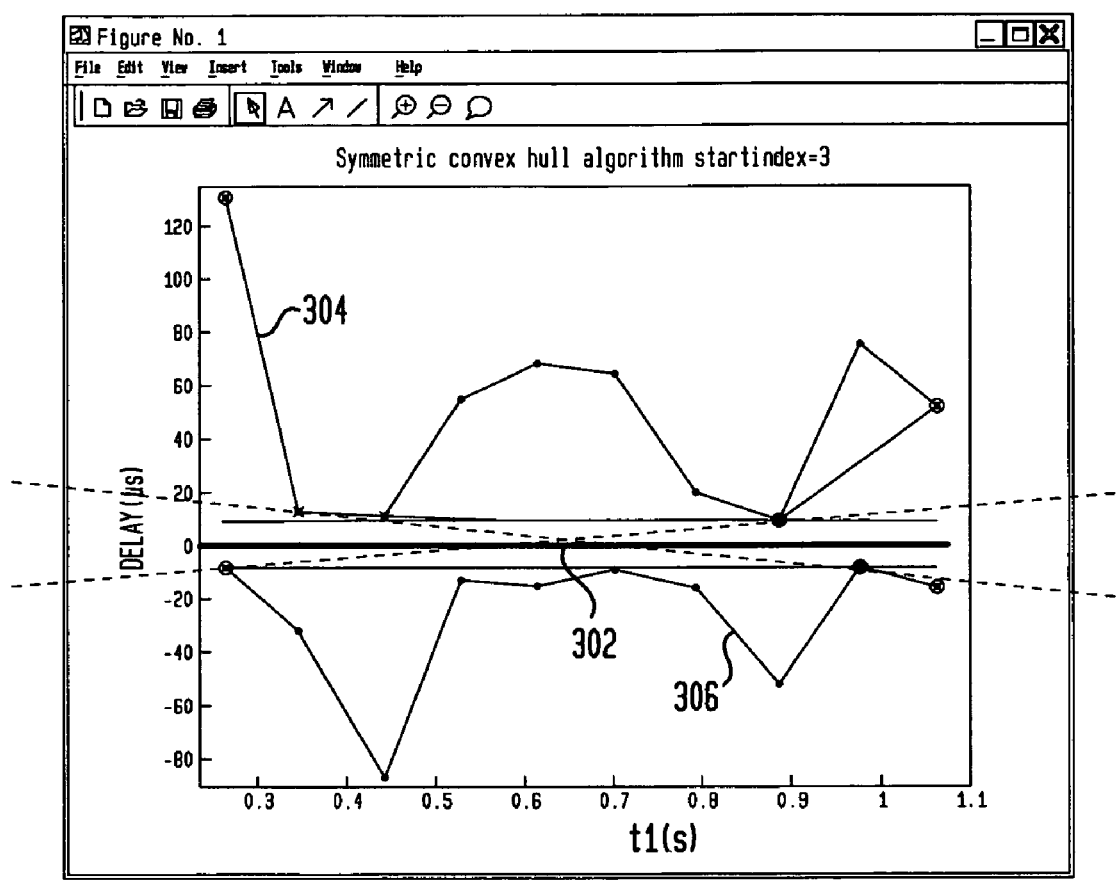
FIG. 7 illustrates a procedure for estimating clock skew and offset between first and second clocks in a computer system.

The present invention uses a symmetric convex hull algorithm to estimate clock skew and offset. FIG. 7 is an example of the results of this algorithm. The line 302 in the middle is the best estimate of the relative clock line. The intercept and slope of this line provides the estimate of the relative offset and skew between the two clocks. The relative clock line can move freely between the top forward delay hull 304 and the bottom negative backward delay hull 306.

The preferred algorithm becomes:

Construct the lower convex hull for forward delay and the upper convex hull for the negative of backward delay.

Spin a pair of parallel lines, counter clockwise between the two convex hulls starting from the left end.

During the spin, the parallel lines are placed as far apart as possible. The two parallel lines touch the vertices of the two convex hulls.

In the spinning process, the touching vertex at the top (forward delay) hull moves from left to right. The touching vertex at the bottom (negative backward delay) hull moves from right to left.

The best parallel skew lines are obtained when the top touching vertex moves to the right of the bottom touching vertex.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A computer implemented method of estimating clock skew and offset between first and second clocks in a computer system, the method comprising the steps of:
   obtaining at the computer system a first set of data values representing a forward delay between the first and second clocks;
   obtaining at the computer system a second set of data values representing a negative backward delay between the first and second clocks;
   generating lower convex hull values on the computer system comprising values of a lower convex hull for said first set of data values;
   generating upper convex hull values on the computer system comprising values of an upper convex hull, below the lower convex hull, for said second set of data values; and
   using the lower and upper convex hull values at the computer system to identify a best position between said lower and upper convex hulls to estimate the clock offset and the skew between said first and second clocks.

2. A computer implemented method according to claim 1, wherein the using step includes the steps of:
   generating clock line data values at the computer system comprising values of a clock line between said first and second convex hulls;
   generating best position data values at the computer system comprising values of a best position for said clock line between said first and second convex hulls; and
   using said best position data values at the computer system to estimate the clock offset and the skew between said first and second clocks.

3. A computer implemented method according to claim 2, comprising the further steps of:
   generating upper maximum position data values at the computer system comprising values of an upper maximum position for said clock line between said upper and lower convex hulls;

generating lower minimum position data values at the computer system comprising values of a lower minimum position for said clock line between said upper and lower convex hulls; and using the upper maximum position data values and the lower minimum position data values at the computer system to estimate the clock offset and said skew between the first and second clocks.

4. A computer implemented method according to claim 3, wherein the step of generating said upper maximum position includes the steps of:

providing a first line between the upper and lower hulls; and spinning said first line between the upper and lower convex hulls, starting from a first end of said hulls.

5. A computer implemented method according to claim 4, wherein the step of generating said lower minimum position includes the steps of:

providing a second line, parallel to said first line, between said upper and lower hulls; and spinning said second line between the upper and lower hulls, starting from said first end of said hulls.

6. A computer implemented method according to claim 5, wherein:

the step of providing the first line includes the step of positioning the first line with said first line touching said upper convex hull; and the step of providing the second line includes the step of positioning the second line with said second line touching said lower convex hull.

7. An estimating system for estimating clock skew and offset between first and second clocks in a computer system, the estimating system comprising the computer system configured for:

generating lower convex hull values on the computer system comprising values of a lower convex hull for a first set of data values representing a forward delay between the first and second clocks, and generating upper convex hull values on the computer system comprising values of an upper convex hull, below the lower convex hull, for a second set of data values representing a negative backward delay between the first and second clocks; and using the lower and upper convex hull values on the computer system to identify a best position between said lower and upper convex hulls to estimate the clock offset and the skew between said first and second clocks.

8. An estimating system according to claim 7, wherein the using includes:

generating clock line data values at the computer system comprising values of a clock line between said first and second convex hulls;

generating best position data values at the computer system comprising values of a best position for said clock line between said first and second convex hulls; and using said best position data values at the computer system to estimate the clock offset and the skew between said first and second clocks.

9. An estimating system according to claim 8, wherein the computer system is further configured for:

generating upper maximum position data values on the computer system comprising values of an upper maximum position for said clock line between said upper and lower convex hulls;

generating lower minimum position data values on the computer system comprising values of a lower minimum position for said clock line between said upper and lower convex hulls; and the upper maximum position data values and the lower minimum position data values at on the computer system using to estimate the clock offset and said skew between the first and second clocks.

10. An estimating system according to claim 9, wherein the generating said upper maximum position includes:

providing a first line between the upper and lower hulls; and spinning said first line between the upper and lower convex hulls, starting from a first end of said hulls.

11. An estimating system according to claim 10, wherein the generating said lower minimum position includes:

providing a second line, parallel to said first line, between said upper and lower hulls; and spinning said second line between the upper and lower hulls, staffing from said first end of said hulls.

12. An estimating system according to claim 11, wherein:

the providing the first line includes positioning the first line with said first line touching said upper convex hull; and the providing the second line includes for positioning the second line with said second line touching said lower convex hull.

13. A program storage device readable by a computer system, tangibly embodying a program of instructions executable by the computer system to perform method steps for estimating clock skew and offset between first and second clocks in a processing system, said method steps comprising:

obtaining at the computer system a first set of data values representing a forward delay between the first and second clocks;

obtaining at the computer system a second set of data values representing a negative backward delay between the first and second clocks;

generating lower convex hull values on the computer system comprising values of a lower convex hull for said first set of data values;

generating upper convex hull values on the computer system comprising values of an upper convex hull, below the lower convex hull, for said second set of data values; and using the lower and upper convex hull values on the computer system to identify a best position between said lower and upper convex hulls to estimate the clock offset and the skew between said first and second clocks.

14. A program storage device according to claim 13, wherein the using step includes the steps of:

generating best position data values at the computer system comprising values of a clock line between said first and second convex hulls;

generating best position data values at the computer system comprising values of a best position for said clock line between said first and second convex hulls; and using said best position data values at the computer system to estimate the clock offset and the skew between said first and second clocks.

15. A program storage device according to claim 14, wherein said method steps comprise the further steps of:

generating upper maximum position data values on the computer system comprising values of an upper maximum position for said clock line between said upper and lower convex hulls;

generating lower minimum position data values on the computer system comprising values of a lower minimum position for said clock line between said upper and lower convex hulls; and using the upper maximum position data values and the lower minimum position data values on the computer system to estimate the clock offset and said skew between the first and second clocks.

16. A program storage device according to claim 15, wherein the step of generating said upper maximum position includes the steps of:

providing a first line between the upper and lower hulls; and spinning said first line between the upper and lower convex hulls, starting from a first end of said hulls.

17. A program storage device according to claim 16, wherein the step of generating said lower minimum position includes the steps of:

providing a second line, parallel to said first line, between said upper and lower hulls; and spinning said second line between the upper and lower hulls, starting from said first end of said hulls.

18. A program storage device according to claim 17, wherein:

the step of providing the first line includes the step of positioning the first line with said first line touching said upper convex hull; and the step of providing the second line includes the step of positioning the second line with said second line touching said lower convex hull.

* * * * *